(12) United States Patent
Kothapalli et al.

(10) Patent No.: US 9,961,911 B2
(45) Date of Patent: May 8, 2018

(54) EXTRUDABLE BATTER COMPOSITIONS FOR USE IN PROVIDING HIGH-FIBER FLOURLESS FOOD PRODUCTS

(75) Inventors: Aparna Kothapalli, Plymouth, MN (US); Craig Sherwin, Minneapolis, MN (US)

(73) Assignee: Genera Mills, Inc., Minneapolis, MN (US)

( * ) Notice: Subject to any disclaimer, the term of this patent is extended or adjusted under 35 U.S.C. 154(b) by 378 days.

(21) Appl. No.: 13/434,593

(22) Filed: Mar. 29, 2012

(65) Prior Publication Data
US 2013/0209646 A1    Aug. 15, 2013

Related U.S. Application Data

(60) Provisional application No. 61/598,062, filed on Feb. 13, 2012.

(51) Int. Cl.

| | |
|---|---|
| *A21D 10/04* | (2006.01) |
| *A21D 13/047* | (2017.01) |
| *A21D 13/40* | (2017.01) |
| *A21D 2/18* | (2006.01) |
| *A21D 2/36* | (2006.01) |
| *A21D 13/04* | (2017.01) |
| *A21D 13/066* | (2017.01) |
| *A23P 30/20* | (2016.01) |
| *A23L 29/244* | (2016.01) |
| *A23L 29/262* | (2016.01) |
| *A23L 7/10* | (2016.01) |
| *A23L 7/117* | (2016.01) |
| *A23L 33/21* | (2016.01) |
| *A23L 33/24* | (2016.01) |
| *A21D 13/31* | (2017.01) |
| *A21D 13/22* | (2017.01) |

(52) U.S. Cl.
CPC ............ *A21D 10/04* (2013.01); *A21D 2/181* (2013.01); *A21D 2/36* (2013.01); *A21D 13/04* (2013.01); *A21D 13/047* (2017.01); *A21D 13/066* (2013.01); *A21D 13/22* (2017.01); *A21D 13/31* (2017.01); *A21D 13/40* (2017.01); *A23L 7/115* (2016.08); *A23L 7/117* (2016.08); *A23L 29/244* (2016.08); *A23L 29/262* (2016.08); *A23L 33/21* (2016.08); *A23L 33/24* (2016.08); *A23P 30/20* (2016.08); *A23V 2002/00* (2013.01)

(58) Field of Classification Search
CPC .............................. A21D 10/04; A21D 10/045
USPC ......................................... 426/552, 553, 550
See application file for complete search history.

(56) References Cited

U.S. PATENT DOCUMENTS

| | | | |
|---|---|---|---|
| 5,766,662 A   * | 6/1998  | Inglett ........................... | 426/481 |
| 7,959,962 B2 * | 6/2011  | Hellwege et al. ............ | 426/549 |
| 2005/0064080 A1 | 3/2005  | Creighton | |
| 2005/0226960 A1 | 10/2005 | Boice | |
| 2007/0065554 A1 * | 3/2007 | O'Connor et al. ........... | 426/549 |
| 2008/0050493 A1 | 2/2008  | Faa | |
| 2008/0063751 A1 * | 3/2008 | Kou ................................ | 426/20 |
| 2008/0241348 A1 * | 10/2008 | Kenyon ........................ | 426/639 |
| 2009/0081335 A1 | 3/2009  | Ortiz | |
| 2010/0303991 A1 * | 12/2010 | Karwowski et al. ......... | 426/560 |
| 2010/0303997 A1 | 12/2010 | Fulton | |

FOREIGN PATENT DOCUMENTS

WO    WO 2011/014468 A1    2/2011

OTHER PUBLICATIONS

Gnu Foods: "Flavor & Fiber Chocolate Brownie Bar", http://store.gnufoods.com/store/fibert-bars/chocolate-brownie.html. Jan. 17, 2012 (1 page).
Enjoy Life: "Chewy on the go Bars," Cocoa Loco (2 pages).
General Mills: "Fiber One Brownies" (1 Page).
"Interesterification Products and Processes," JOACS, Sep. 1967; vol. 41; 414A.

* cited by examiner

*Primary Examiner* — Lien T Tran
(74) *Attorney, Agent, or Firm* — Diederiks & Whitelaw, PLC; Gregory P. Kaihoi, Esq.

(57) ABSTRACT

The invention provides an extrudable batter for use in providing a shelf-stable, ready-to-eat high-fiber food product. The batter comprises a select amount of a powdered fiber, at least one fat component chosen from an oil and a shortening, the shortening having a solid fat content of about 2% to about 30% at ambient temperature, a humectant, a sweetener, a leavening agent and water. The resultant uncooked batter is flourless and gluten-free and is extrudable in a continuous form. The ready-to-eat high-fiber food product produced by such batter contains about 5 grams or more of fiber per serving and substantially maintains, before and after being baked, a desired shape, structure and moisture content.

23 Claims, No Drawings

EXTRUDABLE BATTER COMPOSITIONS FOR USE IN PROVIDING HIGH-FIBER FLOURLESS FOOD PRODUCTS

This application claims priority to Provisional Application No. 61/598,062, filed on Feb. 13, 2012.

FIELD OF THE INVENTION

The invention generally relates to a batter that is extrudable and flourless and that can be used to make a shelf-stable, ready-to-eat baked food product that is high in fiber.

BACKGROUND

In the body, fiber plays many important roles. It slows the rate of digestion and absorption of food and helps regulate blood sugar. It helps lower blood cholesterol. Fiber also promotes a feeling of fullness and helps a person maintain a healthy weight.

It is generally recommended that humans intake about 25 grams of dietary fiber for a 2,000 calorie per day diet. Nonetheless, many humans are not getting enough fiber in their daily diet and fall well below this target. One way to boost fiber intake is to add fiber to baked goods.

Adding fiber to baked goods however presents many challenges. Cellulosic fibers, for example, give an unpleasant cardboard flavor and texture to consumer baked good products. Moreover, fiber's water-holding capacity impacts the extrudability and machinability of a batter or dough used to make a baked good as well as the mouthfeel and moistness of the baked product.

To overcome such challenges, several commercially-available high-fiber baked consumables contain a significant amount of flour and/or hydrocolloids. Flour, and in particular wheat flour, contains gluten, the protein responsible for giving structure to flour-based formulas. Gluten gives breads, cakes, brownies and other baked goods their soft, spongy texture.

However, millions of people do not tolerate gluten. This group includes people with celiac disease, or those who are allergic or intolerant to wheat. Gluten-free baked goods are commercially-available and to compensate for the lack of gluten, these products generally contain one or more additional ingredients such as starch, gums or other forms of hydrocolloids. The addition of starch, gums, or other forms of hydrocolloids to commercially-available baked goods can however raise the cost of manufacturing.

There exists a need therefore for an extrudable batter that is flourless and gluten-free yet is still usable for making a shelf-stable, ready-to-eat high-fiber baked good that substantially maintains a desired shape, structure and moistness after baking without using starch or hydrocolloids to compensate for the lack of flour.

SUMMARY

The invention is directed to a flourless gluten-free batter that is extrudable and that can be used to make a baked food product that is high in fiber and that can maintain a desired shape, structure and moistness before and after being baked.

Specifically, the invention is directed to an extrudable batter for use in providing a shelf-stable, ready-to-eat high-fiber food product. In one example embodiment, the batter comprises a select amount of a powdered fiber, at least one fat component chosen from an oil and a shortening, the shortening having a solid fat content of about 2% to about 30% at ambient temperature, a humectant, a sweetener, a leavening agent and water. The resultant uncooked batter is flourless and is extrudable in a continuous form. The ready-to-eat high-fiber food product produced by such batter contains about 5 grams or more of fiber per serving and substantially maintains, before and after being baked, a desired shape, structure and moisture content.

In another example embodiment, an extrudable batter for use in providing a shelf-stable, ready-to-eat high-fiber food product comprises about 5 wt-% to about 15 wt-% of a powdered inulin, about 5 wt-% to about 15 wt-% of a cellulosic fiber, about 5 wt-% to about 20 wt-% of at least one fat component chosen from an oil and a shortening, the shortening having a solid fat content of about 2% to about 30% at ambient temperature, about 2 wt-% to about 8 wt-% of a humectant, about 5 wt-% to about 25 wt-% of a sweetener, about 0.2 wt-% to about 3 wt-% of a leavening agent and about 15 wt-% to about 25 wt-% of water. The resultant uncooked batter is flourless and is extrudable in a continuous form. The ready-to-eat high-fiber food product made from such batter substantially maintains, before and after being baked, a desired shape, structure and moisture content.

In yet another example embodiment, a shelf-stable, ready-to-eat high-fiber food product is provided that comprises a select amount of at least one powdered fiber, at least one fat component chosen from an oil and a shortening, the shortening having a solid fat content of about 2% to about 30% at ambient temperature, a humectant, a sweetener, a leavening agent and water. The ready-to-eat high-fiber food product is flourless and contains about 5 grams or more of fiber per serving and substantially maintains, before and after being baked, a desired shape, structure and moisture content such that a force required to break the ready-to-eat high-fiber food product does not exceed 10,000 g-force.

DETAILED DESCRIPTION

Various embodiments of the invention are described in more detail below. Numerous modifications and adaptations will be readily apparent to those skilled in the art without departing from the spirit and scope of the present invention.

Throughout the specification and claims, percentages are by weight and temperatures are in degrees Fahrenheit, unless otherwise indicated.

As described herein, "ambient" temperatures generally refer to temperatures in the range of about 65° F. to about 85° F. (about 18° C. to about 30° C.).

As described herein, "shelf stable" means a composition that is formulated to be stored at ambient temperatures for periods of time of up to and including six months, or up to and including 12 months, or up to and including 36 months, without product spoilage.

As described herein, "high-fiber" means a composition that contains about 5 grams or more of fiber per serving.

Fiber

The various example embodiments described herein can contain one or more powdered fibers in place of flour or other gluten-containing ingredients. In one example embodiment, a powdered fiber may be comprised of inulin. Inulin is a particularly useful β-2-fructofuranose material. Generally, inulin is a clean, dried fibrous material which is separated by extraction from, for example, chicory, onions and Jerusalem artichokes and other common plant sources. Inulin is available in various commercial grade varieties. Pure inulin is commercially available from, for example, Rhone-Poulenc in the U.S. under the trade name RAFTI-LINE® and from Imperial Sensus, L.L.C.

In another example embodiment, a powdered fiber may be comprised of a cellulosic fiber. Useful cellulosic fibers may comprise edible, non-digestible parts of a plant that are comprised of cellulose. Examples of cellulosic fibers can include grain hulls and wood pulp.

In a certain embodiment, a cellulosic fiber may be comprised of oat hull fiber (also known as "oat fiber"). One exemplary brand of oat hull fiber that may be useful in an inventive composition is Vitacel® $HF_{301}$.

In another example embodiment, a powdered fiber may be comprised of other sources of fiber. Illustrative powdered fibers can include sugar cane fiber, oat fiber, rice fiber, and konjak fiber.

Useful amounts of powdered fibers in an inventive batter composition can be in a range that produces a high-fiber baked product. Useful amounts of powdered fibers in an inventive batter composition may also be in a range that substantially replaces an amount of flour or other gluten-containing ingredient that could traditionally be used in a shelf-stable, ready-to-eat baked good. In one example embodiment, an amount of powdered inulin in an inventive batter composition can be in a range of about 5% to about 15% by weight. In another example embodiment, an amount of cellulosic fiber in an inventive batter composition can be in a range of about 5% to about 15% by weight, the weight percentages based upon the total weight of an inventive batter composition.

An amount of each powdered fiber that is desirable can also depend on the desired properties of the shelf-stable, ready-to-eat baked food product. In an exemplary embodiment, a baked food product can be a brownie with a desired moistness. To achieve the desired moistness of a brownie in an exemplary embodiment, the ratio of the weight percentage of a powdered inulin to the weight percentage of a cellulosic fiber in an inventive batter composition can be about 1:1. Moreover, to achieve the desired moistness of a brownie in an exemplary embodiment, the ratio of the weight percentage of a powdered inulin to the weight percentage of a cellulosic fiber in an inventive batter composition may not exceed about 1.2:1.

Fat Component

The various embodiments described herein may also contain a fat component. Useful fat components can include oils and can also include shortenings that have an acceptable solid fat content at varying temperatures. In an example embodiment, a fat component can be comprised of an oil that is an interesterified base oil. Useful base oils can comprise fatty acid esters of glycerol, for example, monoglycerides, diglycerides, and triglycerides. Examples of base oils can include soybean oil, corn oil, canola oil, copra oil, cottonseed oil, peanut oil, safflower oil, olive oil, sunflower oil, palm oil, palm kernel oil, coconut oil, rice bran oil, rapeseed oil, other vegetable nut/seed oils, partially hydrogenated oils, and mixtures thereof. In addition, a base oil may be natural or genetically modified or trait enhanced. Examples can include low linolenic soybean oil, high oleic canola oil, and high oleic soybean oil. Also useful can be triglyceride oils that are derived from microorganisms, animals, and plants.

Interesterification refers to the process of rearranging the distribution of fatty acids on the triglyceride molecule, resulting in melting and crystallization characteristics that are similar to partially hydrogenated oils, but without creation of trans fatty acids. Interesterification may be conducted using techniques known to those of skill in the art and may be conducted by an enzymatic process or a chemical process. Details of interesterification can be found, for example, in "*Interesterification Products and Processes*" JOACS, September 1967; Vol. 41; 414A.

In another example embodiment, a fat component can be a shortening having a range of acceptable solid fat contents at varying temperatures. In one embodiment, a shortening may have a solid fat content at 10° C. ranging from about 30% to about 60%. In other embodiments, a shortening can have a solid fat content at 20° C. ranging from about 15% to about 30%, about 2% to about 30% at 30° C., or about 0% to about 40% at 40° C. In still other example embodiments, a shortening can have a solid fat content at ambient temperatures ranging from about 2% to about 30%.

Mixtures of one or more oils described herein can also be used, as can mixtures of oils described herein with shortenings described herein. A particular amount of an oil and/or solid fat component present in an inventive composition can be determined based upon a particular baked good to be provided.

Useful amounts of a total fat component can be in a range that provides a desirable moistness and textural properties to a shelf-stable, ready-to-eat food product. Useful amounts of a total fat component can also be in a range that mixes or disperses in one or more cellulosic fibers. An amount of a total fat component in an inventive batter composition can be in a range of about 5% to about 20% by weight, the weight percentages based upon the total weight of an inventive batter composition.

Humectant

The various embodiments described herein can also include one or more humectants. A humectant suitable for use in an inventive composition can contribute to obtaining a desirable water activity ($a_w$) which can assist in retaining moistness to a baked product produced from an inventive batter composition. A humectant suitable for use in an inventive composition can include hygroscopic substances suitable for use as food additives.

Illustrative humectants can include sugar and/or nonsugar ingredients that can bind moisture in a composition of the various embodiments and may include, for example, fructose, dextrose, corn syrup, corn syrup solids, invert syrup, high fructose corn syrup, refined syrup, honey, molasses, maltose, sorbose, mannose, lactose, galactose, sucrose, and the like, and combinations of any two or more of these.

Suitable nonsugar humectants can include, for example, glycerin, glycerol, sorbitol, mannitol, maltitol, xylitol, propylene glycol, hydrogenated glucose sugar, sugar ester, dextrin and combinations of any two or more of these.

It will be appreciated that many of the humectants described herein can also provide a sweetening effect in an inventive composition and thus can also be categorized as a "sweetener" herein. In some example embodiments, the invention contemplates that an additional ingredient can be added to provide a water-binding feature of a humectant in addition to a sweetener component described herein.

Useful amounts of a humectant may be in a range that provides a desirable water activity ($a_w$). Useful amounts of a humectant can be in a range of no greater than 10% by weight, and alternatively in a range of about 2% to about 8% by weight, the weight percentages based upon the total weight of an inventive batter composition.

Sweetener

The various example embodiments described herein can include a sweetener that can be comprised of a sugar or a nutritive carbohydrate sweetener ingredient. A sweetener can also be comprised of a sugar substitute. Generally, a sweetener may provide sweetness and lower the water activity ($a_w$) of an inventive composition. In the various example embodiments described herein, an inventive composition can include one or more sweeteners; thus, reference to the singular form will be understood to include mixtures where more than one sweetener is included in an inventive composition.

In an example embodiment, a sweetener may be comprised of a sugar. Useful sugars can include saccharides that can reduce the amount of free water in a composition. Useful sugars may include monosaccharides, disaccharides, polysaccharides, sugar alcohols, and their various degradation products. Illustrative sugars can include pentoses, xylose, arabinose, glucose, galactose, amylose, fructose, sorbose, lactose, maltose, dextrose, sucrose, maltodextrins, high fructose corn syrup, molasses, powdered sugar, brown sugar, granulated sugar, liquid sugar, and fine sugar, and combinations of any two or more of these. Exemplary sugar alcohols that can be utilized include isomalt, lactitol, maltitol, mannitol, sorbitol, erythritol, xylitol, glycerol/glycerin, and combinations of any two or more of these.

In other embodiments, a sweetener can be comprised of a sugar substitute. Useful sugar substitutes can include commercially-available prepared sweeteners that are sold as 1:1 replacements to sucrose. Illustrative sugar substitutes may include Truvia® (developed by Cargill and The Coca-Cola Company), PureVia™ (developed by PepsiCo and the Whole Earth Sweetener Company), saccharine, and sucralose, and combinations of any two or more of these. Other illustrative sugar substitutes can include polydextrose, aspartame, potassium acetylsulfame, cyclamate, neotame, alitame, and combinations of any two or more of these.

Because a sweetener can impart sweetness to a shelf-stable, ready-to-eat food product, a type and amount of sweetener can be selected to achieve a balance between reducing the water activity ($a_w$) of an inventive composition a sufficient amount to provide shelf-stability and obtaining a desired degree and quality of sweetness in a baked food product. This can be achieved by balancing the ratios of various sweeteners to one another and the ratios of sweeteners to water in an inventive batter composition.

A useful amount of sweetener in an inventive composition can include an amount that provides suitable properties such as sweetness to a composition, and/or a desired water activity. Some example embodiments contemplate a composition that can have more than one type of sweetener. An amount of total sweetener in an inventive batter composition can be in a range of about 5% to about 25% by weight, the weight percentages based upon the total weight of an inventive batter composition.

Leavening Agent

The various embodiments described herein can include a leavening agent, such as a chemical leavening agent. Chemically-leavenable ("chemically-leavened") batter compositions are batter compositions formulated to provide batters (when combined with other ingredients) that leaven to a substantial extent by the action of chemical ingredients that react to produce a leavening gas. Typically, the ingredients of a chemical leavening agent can include a basic chemical leavening agent and an acidic chemical leavening agent that react together to produce carbon dioxide, which, when retained by a batter matrix, causes the batter to expand. Chemically-leavenable batters can be contrasted with batter formulations that are substantially leavened due to the action of yeast as a leavening agent, that is, by metabolic action of yeast on a substrate to produce carbon dioxide.

Basic chemical leavening agents are generally known in the baking arts, and any chemical leavening base that is capable of undergoing a reaction with a chemical leavening acid is suitable for use in a batter composition of the invention. A basic agent may be encapsulated or non-encapsulated. Both encapsulated and non-encapsulated basic chemical leavening agents are generally known and commercially available, and can be prepared by methods known in the baking and encapsulation arts.

As a result, only the exemplary chemical leavening bases, namely sodium bicarbonate (baking soda), ammonium carbonate, ammonium bicarbonate, and potassium bicarbonate are recited herein. In some aspects, baking soda can serve as the primary source of carbon dioxide gas in many chemical leavening agent systems.

Acidic chemical leavening agents are generally known in the baking arts, with examples including sodium aluminum phosphate (SALP), sodium acid pyrophosphate (SAPP), monosodium phosphate, monocalcium phosphate monohydrate (MCP), anhydrous monocalcium phosphate (AMCP), dicalcium phosphate dihydrate (DCPD), dicalcium phosphate (DCP), sodium aluminum sulfate (SAS), glucono-delta-lactone (GDL), potassium hydrogen tartrate (cream of tartar) as well as a variety of others, and combinations of any of these. Commercially available acidic chemical leavening agents can include those sold under the trade names: Levn-Lite® (SALP), Pan-O-Lite® (SALP+MCP), STABIL-9® (SALP+AMCP), PY-RAN® (AMCP), and HT® MCP (MCP). Acidic chemical leavening agents come in a variety of solubilities at different temperature ranges, and may be either encapsulated or non-encapsulated. An illustrative leavening agent system may include sodium aluminum phosphate and baking soda.

Chemical leavening agents can be present in an amount that provides one or more useful properties as described herein, including stability at ambient temperatures/conditions, and desired baked leavening properties following storage at ambient conditions. For example, a leavening agent can make up about 0.2% to about 3% by weight of an inventive batter composition.

Alternatively, a leavening agent can be a yeast-leavened system, wherein the yeast becomes non-viable upon baking an inventive batter composition.

Water

The various embodiments described herein may also include water. Useful amounts of water can be in a range that provides a desirable moisture content and mouthfeel to a shelf-stable, ready-to-eat baked food product. Useful amounts of water can also be in a range that provides hydration of various ingredients in an inventive batter composition. Water in an inventive batter composition can also serve as a plasticizer and can also regulate the viscosity of a batter composition. An amount of water in an inventive batter composition can be in a range of about 15% to about 20% by weight, the weight percentages based upon the total weight of an inventive batter composition.

Optionally, the various embodiments described herein can also include an egg component. An egg component can be present as an egg solid and/or an egg liquid. An egg solid and/or egg liquid can provide desirable structural, viscosity, and emulsification benefits to an inventive batter composition. An egg component can also aid in extrudability of an inventive batter composition. If present, an egg component can comprise about 0.5% to about 4% by weight of an inventive batter composition.

Other structure-forming elements can also optionally be used in the various example embodiments described herein.

Exemplary structure-forming elements can include soy proteins, hydrocolloids, dairy proteins, and mixtures thereof. Illustrative dairy proteins may include whey, caseinate, buttermilk, buttermilk solids, and nonfat dry milk. If present, a structure-forming element can comprise about 0.5% to about 5% by weight of an inventive batter composition.

Optionally, a composition of the various example embodiments described herein can also include a variety of additional minor ingredients or "conventional additives" suitable for rendering finished baked goods more organoleptically desirable. Such optional components can include anti-oxidants, salt, coloring agents, flavoring agents, preservatives, spices, flavor chips and particulates (such as nuts, fruit pieces, and other edible inclusions). Flavoring agents can include natural or artificial flavors. Illustrative examples of flavors may include chocolate, cocoa, strawberry, mint chocolate, mint, vanilla, vanilla extract, butterscotch, peanut butter, coffee, caramel and mixtures thereof. Illustrative examples of flavor chips can include chocolate, mint chocolate, butterscotch, peanut butter chips, and mixtures thereof. A flavor chip can be coated with topical film to minimize moisture migration such as with a hard fat or with edible shellac. Inclusions can include fruit (such as berries), nuts, and the like. Optionally, an inclusion (such as a fruit piece) can be coated with starch or cellulose gum, for example, to reduce or minimize bleeding of a fruit color into a batter composition during mixing and/or depositing. If present, conventional additives collectively can comprise about 0% to about 25% by weight of an inventive batter composition.

In an alternative embodiment, an inventive composition can also include starch in place of one or more powdered fibers, or to replace a select amount of one or more powdered fibers. A starch can be any common food starch, for example, potato starch, corn starch, wheat starch, rice starch, barley starch, oat starch, tapioca starch, arrowroot, sago starch, and the like, and mixtures thereof. Modified starches and pregelatinized starches can also be used. If present, a starch ingredient(s) can comprise about 0% to about 7% by weight of an inventive batter composition.

A shelf-stable, ready-to-eat baked food product can have any suitable shape and size that maintains a high-fiber content of a baked good. In some embodiments, a baked food product can have a substantially square or rectangular shape. In some representative embodiments, a baked food product can have a length from about 2.25 centimeters (cm) to about 2.31 cm, a width from about 2.00 cm to about 2.40 cm and a height from about 0.55 cm to about 0.65 cm. Similarly, a baked food product can have any suitable weight that maintains a high-fiber content of a baked good. For example, a baked food product can be bite-sized for an average consumer or be comprised of heavier embodiments.

A shelf-stable, ready-to-eat baked food product may also optionally include a topping and/or a filling. A topping may cover an entire surface of a food item or only a portion of a surface in the form of a drizzle. Similarly, a topping may be continuous or intermittent. A topping may or may not be uniform over an area applied. For example, a flavor, color and/or thickness may be different at different locations over a surface of a food item. Similarly, a filling may or may not be uniform across a food item. For example, in one embodiment, a filling may only be placed at the center of a food item rather than across a layer extending through a section of a food item. Similarly, for a food item with a filling and a coating, the filling and coating can be different from each other with respect to color, flavoring, consistency, or other aesthetic features.

A person of ordinary skill in the art can select a desired topping and/or filling to meet the particular aesthetics of a desired food product. Exemplary toppings can include frosting, icing, nuts, chocolate chips, peanut butter chips, mint chips, sprinkles, coconut, nuts, and mixtures thereof. Exemplary fillings can include chocolate fudge, peanut butter, mint, strawberry, whipped cream, and mixtures thereof.

An illustrative formulation for an inventive batter composition is as follows:

| Ingredient | Useful ranges (weight percent) |
|---|---|
| Powdered inulin | 5-15 |
| Cellulosic fiber | 5-15 |
| At least one fat component selected from the group consisting of an oil and a shortening, the shortening having a solid fat content of about 2% to about 30% at ambient temperature | 5-20 |
| Humectant | 2-8 |
| Sweetener | 5-25 |
| Leavening agent | 0.2-3 |
| Water | 15-25 |

In an embodiment, an inventive batter composition can be extrudable uncooked in a continuous form such as a continuous plastic rope or a continuous slab. An extrudate can also be characterized by a pattern including a peripheral shape such as a circle, star, animal figure, or any other shape including both regular and irregular shapes.

Ready-to-eat baked food products of the various embodiments described herein can be shelf-stable. In an exemplary embodiment, shelf-stability can be measured by a desired water activity ($a_w$) of an inventive baked food product. In a certain embodiment, the desired water activity ($a_w$) of a ready-to-eat baked food product can be in a range of about 0.58 to about 0.65. Water activity levels of an inventive composition can be obtained by either a capacitance or a dew point hygrometer.

A shelf-stable, ready-to-eat baked food product may also maintain a desired shape and structure before and after baking. In an exemplary embodiment, a desired density corresponds to a desired structure. In an example embodiment, an inventive baked food product can maintain a desired density after baking. In a representative embodiment, the average desired density of a ready-to-eat baked food product with chips can be about 0.6 g/cc. A desired density can be variable however depending upon which final baked good is desired.

In another embodiment, a desired texture corresponds to a desired structure. In one embodiment, an inventive baked food product can maintain a desired texture after baking. In an exemplary embodiment, texture can be measured as a force required to break an inventive baked food product. In a representative embodiment, a force required to break an inventive baked food product is no greater than 10,000 g-force.

Moreover, a shelf-stable, ready-to-eat baked food product can maintain a desired moistness before and after baking. In one embodiment, a desired moistness can be measured by a baked food product's moisture content. In an example embodiment, an inventive baked food product can maintain a desirable moisture content after baking. In a representative embodiment, a desirable moisture content of an inventive baked food product can be in the range of about 9% to about 13%. A desirable moisture content can be variable however depending upon which final baked good is desired.

The invention also relates to methods of making an inventive composition. In the various embodiments described herein, an inventive method can include a step of mixing together a desired amount of water and one or more humectants in any standard batter or dough mixer. Optionally, one or more flavoring agents can also be mixed together with water and humectant(s). A method of making an inventive composition can also include a step of mixing together with humectant(s) and water a desired amount of each of the following ingredients: at least one powdered fiber other than cellulosic fiber, at least one fat component selected from the group consisting of an oil and a shortening, the shortening having a solid fat content of about 2% to about 30% at ambient temperature, one or more sweeteners, and at least one leavening agent. Optionally, in one embodiment, a select amount of an egg component may also be mixed together with humectant(s) and water.

In another embodiment, a method of making an inventive composition may further include a step of adding one or more cellulosic fibers to a batter mixture. If one or more cellulosic fibers are added to an inventive batter mixture, the cellulosic fibers can first be mixed with a fat component before being added to the batter mixture. The fat component can be a fat selected from the group consisting of an oil and a shortening, the shortening having a solid fat content of about 2% to about 30% at ambient temperature. The step of adding at least one cellulosic fiber should occur after other mixing steps so as to prevent cellulosic fiber(s) from absorbing water prematurely before allowing other ingredients to interact with water.

Once all desired ingredients are mixed together for a sufficient amount of time to create a flowable batter, in one example embodiment, an inventive batter composition is held for about thirty minutes or more. Holding an inventive batter composition for about thirty minutes or more allows a batter to acquire a sufficient viscosity to make it extrudable. In another example embodiment, an inventive batter composition is held for an amount of time less than thirty minutes that is sufficient for producing an extrudable batter. In an alternative embodiment, an inventive batter composition is baked in a pan, and therefore no substantial holding time is required.

In another example embodiment, a method of making an inventive composition includes a step of adding one or more particulates to an inventive batter composition. In an alternative embodiment, a method of making an inventive composition may also include a step of adding one or more fillings to an inventive batter composition.

In an exemplary embodiment, an inventive batter composition can then be extruded uncooked in a continuous form through any standard commercial extrusion process. An extrusion process generally provides mixing and forming in a single operation and creates a pressure differential that conveys a batter from an input end of an operation to an extrusion nozzle output end of an operation. Different than depositing, an extruded food can retain its shape and can be formed into a rope or other continuous form onto a belt or other mechanism for further processing downstream. Additionally, extrusion can also help in shape-forming a batter composition into an even format that can allow for uniform baking.

In another example embodiment, an extruded batter composition can be baked for about 10-20 minutes at about 300-400° F. One of ordinary skill in the art will understand that, depending on a desired shape and size of a baked food product, other ranges of temperatures and ranges of minutes can be used in baking.

In one embodiment, a baked food product can be cut into one or more desired shapes. Optionally, one or more toppings may be applied to a baked good before or after cutting.

EXAMPLE

For the preparations described in this example embodiment, bench top samples were prepared and evaluated. Unless specifically stated otherwise, reference to a mixer and mixing steps for preparation of the inventive batter compositions refers to a Kitchen Aid standard countertop mixer.

An inventive batter composition for providing shelf-stable, ready-to-eat high-fiber brownies was prepared using the following formula:

| Ingredient | Weight Percent of Total Batter Composition |
| --- | --- |
| Powdered inulin | 10.00 |
| Oat hull fiber | 10.00 |
| Oil | 10.00 |
| Humectant | 4.00 |
| Sweetener | 22.00 |
| Egg solids | 1.00 |
| Sodium bicarbonate | 0.20 |
| Sodium aluminum phosphate | 0.20 |
| Water | 20.60 |
| Flavoring agents | 21.50 |
| Salt | 0.50 |

Water, humectant, and flavoring agents were combined and mixed together. Each ingredient was added to the mixture in no specific order. In no certain order, powdered inulin, salt, sodium bicarbonate, sodium aluminum phosphate, egg solids, and sweetener were added to the water and humectant mixture and blended. Oil and oat hull fiber were combined together and then added to the brownie batter mixture.

The brownie batter mixture was then held for at least thirty minutes. Alternatively, the brownie batter composition could have been held for a shorter time period that was sufficient to allow the fibers in the brownie batter composition to hydrate lending sufficient viscosity to the batter for extrusion.

The brownie batter composition was extruded uncooked in a continuous rope form and baked for 10-15 minutes at 325-350° F. After baking and sufficient cooling, the rope or substrate was cut into individual ready-to-eat high-fiber brownies.

Each exemplary ready-to-eat high-fiber brownie contained at least 5 grams of fiber and was shelf-stable with an $a_w$ ranging from about 0.58 to about 0.64.

Each exemplary brownie could also maintain its desired bar shape after baking, and could maintain its desired structure and moistness after baking. The average density of each exemplary brownie was about 0.61 g/cc after baking, with a standard deviation of about 0.36 g/cc. The moisture content of each exemplary brownie ranged from about 9-13% to about 15-20% after baking. Moreover, the force required to break each exemplary brownie ranged from about 3700 g-force to about 6500 g-force.

Variations on the exemplary embodiments described herein will become apparent to those of skill in the relevant arts. The inventors expect those of skill to use such variations as appropriate, and intend for the invention to be practiced otherwise than specifically described herein. Accordingly, the invention includes modifications and equivalents of the subject matter recited in the claims as permitted by applicable law. Moreover, any combination of the above-described elements in all possible variations thereof is encompassed by the invention unless otherwise indicated.

The invention claimed is:

1. An extrudable batter for use in providing a shelf-stable, ready-to-eat high-fiber food product, said batter comprising:
   at least 10 wt-% powdered fiber;
   at least one fat component chosen from an oil and a shortening, said shortening having a solid fat content of about 2% to about 30% at ambient temperature;
   a humectant;
   a sweetener;
   a leavening agent; and
   about 15 wt-% to 25 wt-% of free water;
   wherein said batter is flourless, does not include starch compensating for the lack of flour and is extruded in a continuous form, and wherein said ready-to-eat high-fiber food product contains about 5 grams or more of fiber per serving and substantially maintains after being baked a desired shape, structure and moisture content.

2. The extrudable batter of claim 1 wherein said powdered fiber is comprised of an inulin and a cellulosic fiber.

3. The extrudable batter of claim 2 wherein said cellulosic fiber is oat hull fiber.

4. The extrudable batter of claim 2 wherein the ratio of the wt-% of powdered inulin to the wt-% of cellulosic fiber in said batter is about 1:1.

5. The extrudable batter of claim 2 wherein the ratio of the wt-% of powdered inulin to the wt-% of cellulosic fiber in said batter is no greater than 1.2:1.

6. The extrudable batter of claim 1 wherein said oil is an interesterified base oil.

7. The extrudable batter of claim 1 wherein said leavening agent is comprised of baking soda and sodium aluminum phosphate.

8. The extrudable batter of claim 1 wherein said humectant is glycerine.

9. The extrudable batter of claim 1 wherein said sweetener is at least one sweetener chosen from sugar and a sugar substitute.

10. The extrudable batter of claim 1 wherein said leavening agent is heat activated.

11. The extrudable batter of claim 1 further comprising a flavoring agent, wherein the flavoring agent is cocoa.

12. The extrudable batter of claim 1 further comprising a particulate.

13. The extrudable batter of claim 12 wherein said particulate is selected from a group consisting of chocolate chips, peanut butter chips, mint chips, nuts, candy and fruit.

14. The extrudable batter of claim 1 further comprising a filling.

15. The extrudable batter of claim 14 wherein said filling is selected from a group consisting of chocolate fudge, peanut butter, mint, strawberry, and whipped cream.

16. The extrudable batter of claim 1 further comprising a topping.

17. The extrudable batter of claim 16 wherein said topping is selected from a group consisting of frosting, icing, nuts, chocolate chips, peanut butter chips, mint chips, sprinkles, coconut, and nuts.

18. The extrudable batter of claim 1 further comprising at least one structure-forming element selected from a group consisting of egg solids, egg liquids, soy proteins, dairy proteins, and hydrocolloids.

19. The extrudable batter of claim 1 wherein said batter is extruded as a rope or a slab.

20. The extrudable batter of claim 1 wherein said ready-to-eat high-fiber food product maintains after being baked a bar shape with a desired width and length.

21. The extrudable batter of claim 1, further comprising about 0.5 wt-% to about 4 wt-% of an egg component.

22. An extrudable batter for use in providing a shelf-stable, ready-to-eat high-fiber food product, said batter comprising:
   (a) 5 wt-% to about 15 wt-% of a powdered inulin;
   (b) 5 wt-% to about 15 wt-% of a cellulosic fiber;
   (c) about 5 wt-% to about 20 wt-% of at least one fat component chosen from an oil and a shortening, said shortening having a solid fat content of about 2% to about 30% at ambient temperature;
   (d) about 2 wt-% to about 8 wt-% of a humectant;
   (e) about 5 wt-% to about 25 wt-% of a sweetener;
   (f) about 0.2 wt-% to about 3 wt-% of a leavening agent; and
   (g) about 15 wt-% to 25 wt-% of free water;
   wherein said batter is flourless, does not include starch compensating for the lack of flour and is extruded in a continuous form, and wherein said ready-to-eat high-fiber food product substantially maintains after being baked a desired shape, structure and moisture content.

23. The extrudable batter of claim 22, further comprising about 0.5 wt-% to about 4 wt-% of an egg component.

* * * * *